Sept. 17, 1946.   C. H. BASSETT   2,407,944
INDICATOR FOR VALVES
Filed March 17, 1944
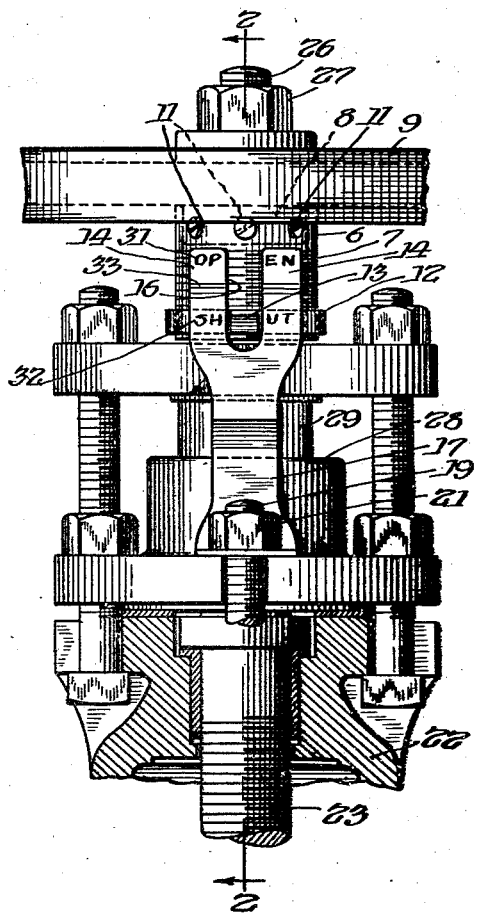
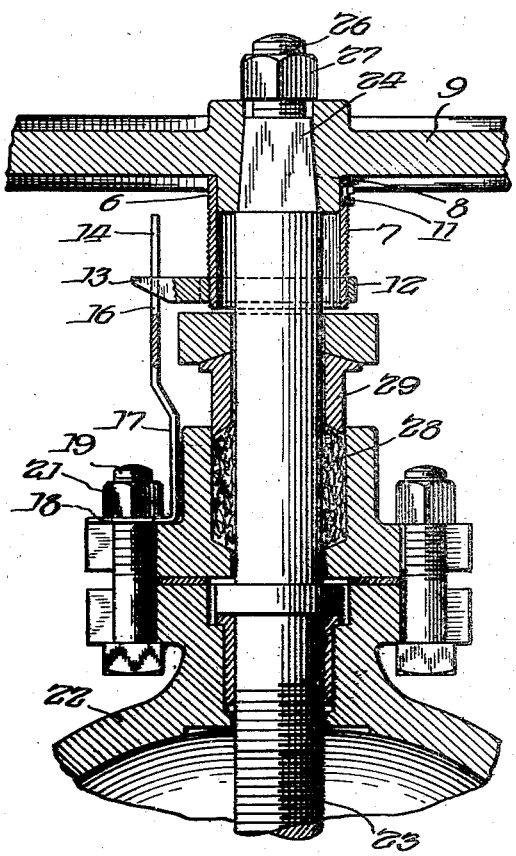
Inventor:
Charles H. Bassett,
By: Joseph O. Lange, Atty.

UNITED STATES PATENT OFFICE 2,407,944

INDICATOR FOR VALVES

Charles H. Bassett, Chicago, Ill., assignor to Crane Co., Chicago, Ill., a corporation of Illinois Application March 17, 1944, Serial No. 526,981

1 Claim. (Cl. 116—125)

This invention relates to indicators for valves and is more particularly concerned with indicating means for use on valves or the like of the non-rising stem type to disclose the position of the valve closure member with respect to the body seat in the valve housing, and has for an object the provision of an indicating means which is relatively inexpensive in construction, reliable in operation, and which will not readily get out of order.

This invention further contemplates the provision of an indicating means in which a threaded sleeve may be formed integral with or attachable to a handwheel to receive and actuate an internally threaded pointer in order to permit repacking of a valve stuffing box without disturbing the original setting of the indicator.

This invention embodies other novel features, details of construction and arrangement of parts which are hereinafter set forth in the specification and claim and illustrated in the accompanying drawing, forming part thereof, wherein:

Fig. 1 is a front elevational view showing an indicator embodying features of this invention as mounted for use on a non-rising stem valve.

Fig. 2 is a sectional view taken along the line 2—2 of Fig. 1.

Referring now to the drawing for a better understanding of this invention, I show a valve indicator device comprising a sleeve 6 which is externally threaded at 7 and secured to a hub portion 8 of a handwheel 9 by means of set screws 11. If desired, the sleeve 6 may be formed integral with the handwheel. A pointer 12 is internally threaded for axial movement along the sleeve 6 and is formed with a lug portion 13 for engagement between a pair of fingers 14 defining a slot 16 in an indicator plate 17. The plate 17 is provided with an aperture 18 to receive a stuffing box bolt 19 and is held against displacement therefrom by a nut 21.

The upper portion of a non-rising stem valve 22 has been shown to illustrate the application of this invention and comprises a stem 23 having a square portion 24 to receive the handwheel 9 and a threaded end 26 to receive a locking nut 27. A stuffing box 28 and a gland 29 suitably enclose the stem.

In operation, rotational movement of the handwheel 9 causes axial movement of the pointer 12 between the full open position and the full closed position marked at 31 and 32, respectively, on the indicator plate 17. Suitable intermediate graduated markings 33 are provided on the plate to indicate intermediate positions of the valve closure member (not shown).

In repacking a valve equipped with an indicator device as shown, the handwheel is removed from the stem to permit removal of the gland 29. After repacking of the stuffing box it will be apparent that the handwheel may again be mounted on the stem without disturbing the original setting of the indicator device. With prior indicator devices the pointer is either threaded onto the stem or on a bushing secured thereto and the removal thereof necessitates the objectionable resetting of the pointer with respect to the graduations of a plate and to the valve closure member.

While this invention has been shown in but one form it is obvious to those skilled in the art that it is not so limited but is susceptible of various changes and modifications without departing from the spirit thereof or the appended claim.

I claim:

An indicator device for a non-rising stem valve or the like having a closure member and an operating stem, stem actuating means therefor provided with a lower depending hub portion, an externally threaded sleeve provided on and fixed to the external portion of the said hub portion of the said stem actuating means, an internally threaded pointer mounted for relative rotation on and axial movement along said threaded sleeve, the said rotation and axial movement being responsive to rotational movement of the said threaded sleeve, a graduated indicator plate co-acting with the said pointer to prevent rotational movement of the said pointer but to provide axial movement and for indicating the position of the said closure member at and between its open and closed positions.

CHARLES H. BASSETT.